(12) United States Patent
Yen et al.

(10) Patent No.: US 9,218,843 B2
(45) Date of Patent: Dec. 22, 2015

(54) AUDIO CONTROLLER OF A DOCKING STATION

(75) Inventors: Peter Yen, Houston, TX (US); Bart Downing, Spring, TX (US); James Herbert, Houston, TX (US); David Lombard, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 244 days.

(21) Appl. No.: 13/700,131

(22) PCT Filed: May 27, 2010

(86) PCT No.: PCT/US2010/036393
§ 371 (c)(1),
(2), (4) Date: Nov. 26, 2012

(87) PCT Pub. No.: WO2011/149467
PCT Pub. Date: Dec. 1, 2011

(65) Prior Publication Data
US 2013/0073066 A1    Mar. 21, 2013

(51) Int. Cl.
G06F 17/00 (2006.01)
G06F 13/00 (2006.01)
G11B 19/02 (2006.01)
G11B 20/10 (2006.01)
G11B 31/00 (2006.01)
G06F 1/16 (2006.01)

(52) U.S. Cl.
CPC .......... *G11B 19/02* (2013.01); *G11B 20/10527* (2013.01); *G11B 31/00* (2013.01); *G06F 1/1632* (2013.01); *G11B 2020/10546* (2013.01)

(58) Field of Classification Search
CPC .. G06F 1/1632; G06F 21/85; H04M 1/72527; H04M 1/6066; H04N 21/4126; H04N 5/765; H04R 2205/021
See application file for complete search history.

(56) References Cited

U.S. PATENT DOCUMENTS

| 6,148,353 | A | 11/2000 | Cho |
| 6,618,636 | B1 | 9/2003 | Sakai et al. |
| 6,983,053 | B2 | 1/2006 | Lee et al. |
| 2001/0038032 | A1* | 11/2001 | Kang et al. .................... 235/375 |
| 2008/0219488 | A1 | 9/2008 | Crooijmans |
| 2008/0269927 | A1* | 10/2008 | Szolyga et al. ................. 700/94 |

(Continued)

FOREIGN PATENT DOCUMENTS

WO    WO-2008100060    8/2008

OTHER PUBLICATIONS

Softpanorama, "How do I get my microphone to work when plugged into a Dell™ C-Dock or C-Dock II docking station", Retrieved from the Internet Nov. 21, 2012, http://www.softpanorama.org/Hardware/Dell/C600/index.shtml.

(Continued)

*Primary Examiner* — Curtis Kuntz
*Assistant Examiner* — Thomas Maung
(74) *Attorney, Agent, or Firm* — HP Legal Department

(57) ABSTRACT

A method for managing audio of a device including scanning for an audio controller of a docking station coupled to the device, determining whether an audio device is coupled to an audio interface of the docking station if the device is coupled to the audio controller, and transferring audio between the device and the audio controller of the docking station if the audio device is coupled to the audio interface of the docking station.

15 Claims, 7 Drawing Sheets

(56) References Cited

U.S. PATENT DOCUMENTS

| | | |
|---|---|---|
| 2008/0307144 A1 | 12/2008 | Minoo |
| 2009/0063744 A1* | 3/2009 | Krueger et al. ............... 710/303 |
| 2009/0112339 A1 | 4/2009 | Huang et al. |
| 2009/0271534 A1 | 10/2009 | Acosta et al. |

OTHER PUBLICATIONS

WIPO, International Search Report dated Feb. 28, 2011, PCT App No. PCT/US2010/036393 filed May 27, 2010.

* cited by examiner

AUDIO CONTROLLER OF A DOCKING STATION

BACKGROUND

When outputting or receiving audio on a device, a user can access one or more input devices on the device and proceed to configure one or more audio settings on the device. Utilizing an input device, the user can manipulate one or more of the audio settings to specify whether audio is to be controlled using one or more devices included in the device or to use one or more devices which can be coupled to the device.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

By scanning a docking station for an audio controller in response to the device coupling to the docking station, an audio management application can accurately determine whether an audio device is coupled to an audio interface of the docking station. Additionally, by transferring audio between the device and the audio controller of the docking station in response to the audio device being coupled to the audio interface, audio on the device can securely and efficiently be managed. As a result, a user friendly audio experience can be created for a user when the user is using a device with a docking station.

Figure 1:
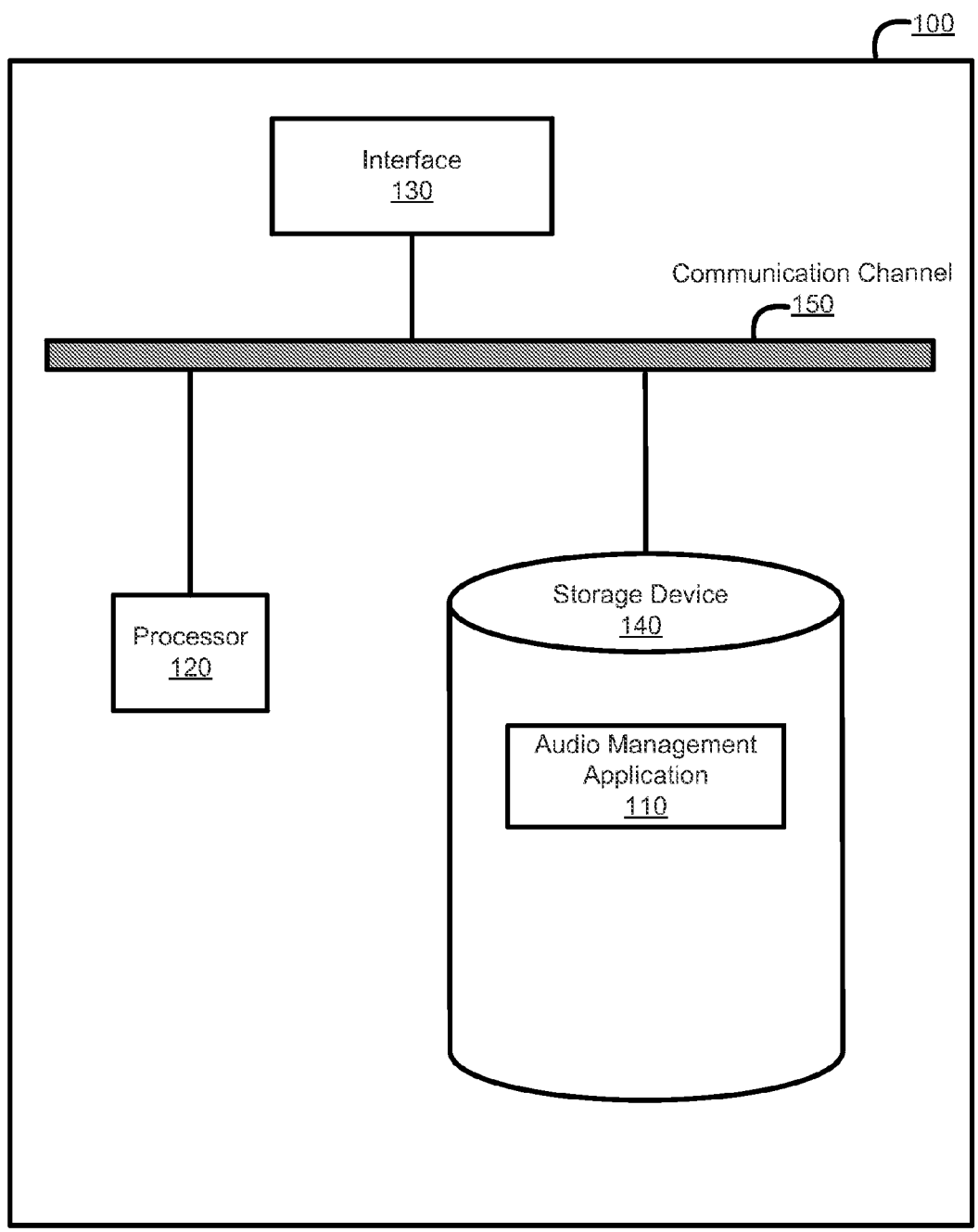
FIG. 1 illustrates a device with an interface and an audio management application according to an embodiment of the invention.

FIG. 1 illustrates a device 100 with an interface 130 and an audio management application 110 according to an embodiment of the invention. In one embodiment, the device 100 is a desktop, a laptop, a netbook, a server, and/or any computing device which can include an interface 130 and an audio management application 110. In another embodiment, the device 100 is a PDA, a cellular device, and/or any portable device which can include an audio management application 110.

As illustrated in FIG. 1, the device 100 includes a processor 120, a storage device 140, an interface 130, and a communication bus 150 for the device 100 and/or one or more components of the device 100 to communicate with one another. Additionally, as shown in FIG. 1, the storage device 140 includes an audio management application 110. In other embodiments, the device 100 includes additional components and/or is coupled to additional components in addition to and/or in lieu of those noted above and illustrated in FIG. 1.

As noted above, the device 100 includes a processor 120. The processor 120 sends data and/or instructions to the components of the device 100, such as the interface 130 and the audio management application 110. Additionally, the processor 120 receives data and/or instruction from components of the device 100, such as the interface 130 and the audio management application 110.

The audio management application 110 is an application which manages audio to and/or from the device 100. When managing audio, the audio management application 110 scans a docking station for an audio controller in response to the interface 130 of the device 100 coupling the device 100 to the docking station. For the purposes of this application, the interface 130 is a component of the device 100 configured to couple the device 100 to the docking station. Additionally, for the purposes of this application, a docking station is a device which can couple and interface with the device 100. When coupled and interfaced with the device 100, the audio management application 110 and/or the interface 130 can scan the docking station for an audio controller.

If an audio controller is found on the docking station, the audio management application 110 can couple and interface with the audio controller. Additionally, once the audio management application 110 has coupled to the audio controller, the audio management application 110 can determine whether an audio device is coupled to an audio interface of the docking station. If an audio device is determined to be coupled to an audio interface of the docking station, the audio management application 110 proceeds to transfer audio between the device 100 and the audio controller of the docking station. The audio can be transferred as one or more digital or analog signals.

The audio management application 110 can be firmware which is embedded onto the device 100 and/or the storage device 140. In another embodiment, the audio management application 110 is a software application stored on the device 100 within ROM or on the storage device 140 accessible by the device 100. In other embodiments, the audio management application 110 is stored on a computer readable medium readable and accessible by the device 100 or the storage device 140 from a different location.

Additionally, in one embodiment, the storage device 140 is included in the device 100. In other embodiments, the storage device 140 is not included in the device 100, but is accessible to the device 100 utilizing a network interface included in the device 100. The network interface can be a wired or wireless network interface card. In other embodiments, the storage device 140 can be configured to couple to one or more ports or interfaces on the device 100 wirelessly or through a wired connection.

In a further embodiment, the audio management application 110 is stored and/or accessed through a server coupled through a local area network or a wide area network. The audio management application 110 communicates with devices and/or components coupled to the device 100 physically or wirelessly through a communication bus 150 included in or attached to the device 100. In one embodiment the communication bus 150 is a memory bus. In other embodiments, the communication bus 150 is a data bus.

Figure 2:
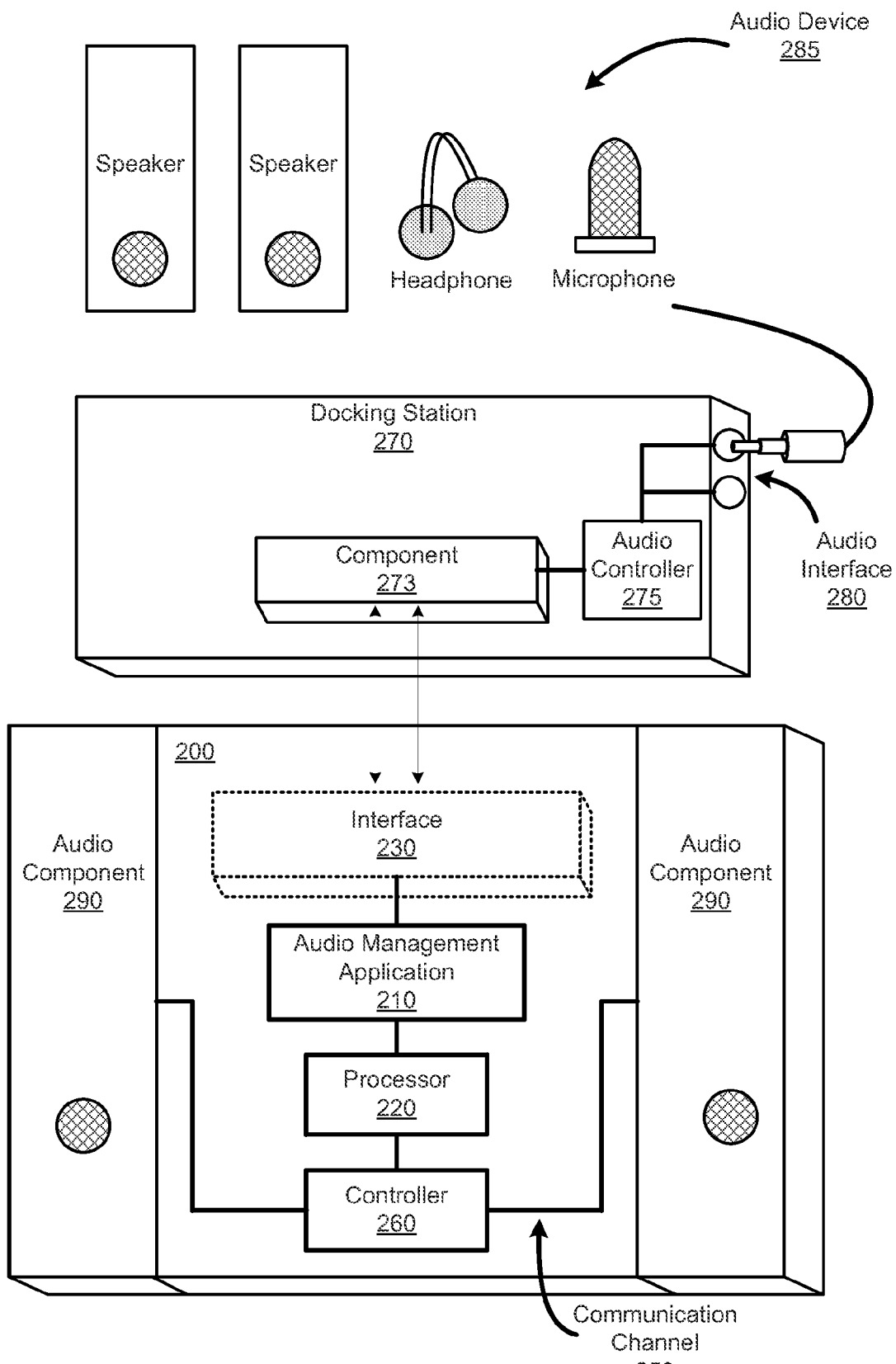
FIG. 2 illustrates a device and an audio device coupled to the docking station according to an embodiment of the invention.

FIG. 2 illustrates a device 200 and an audio device 285 coupled to a docking station 270 according to an embodiment of the invention. As illustrated in the present embodiment, the device 200 can include a controller 260. For the purposes of this application, the controller 260 is a component of the device 200 configured by the audio management application 210 to manage audio sent from the device 200 and to manage audio received by the device 200. When managing the audio, the controller 260 can be instructed by the audio management application 210 of the device 200 to utilize an audio component 290 coupled to the device 200 or to transfer audio between the device 200 and an audio controller 275 of the docking station 270 when receiving audio or when outputting audio.

As noted above, when determining whether to utilize an audio component 290 or the audio controller 275, a processor 220 of the device 200 can initially send one or more instructions for an audio management application 210 to scan a docking station 270 for the audio controller 275 in response to the device 200 coupling to the docking station 270. As noted above and as shown in FIG. 2, the device 200 includes an interface 230.

The interface 230 is a component of the device 200 configured to couple the device 200 to the docking station 270 by engaging a component 273 of the docking station 270. In one embodiment, the interface 230 can include one or more ports which can physically engage and couple with the component 273 of the docking station 270. In another embodiment, the interface 230 can include one or more wireless devices configured to engage and couple with the component 273 of the docking station 270 through a wireless connection.

Additionally, the component 273 is a device or component of the docking station 270 configured to engage the interface 230 when coupling the docking station 270 to the device 200. The component 273 can physically engage one or more ports of the interface 230. In another embodiment, the component 273 can include one or more wireless devices configured to engage and couple with the interface 230 of the device 200 through a wireless connection.

When the interface 230 of the device 200 is coupled to the component 273 of the docking station 270, the interface 230 can notify the audio management application 210 that the device 200 is coupled to the docking station 270. In response to the device 200 coupling to the docking station 270, the audio management application 210 can proceed to scan the docking station 270 for an audio controller 275 of the docking station 270 through the interface 230. When scanning the docking station 270, the audio management application 210 can couple with one or more components of the docking station 270 through the interface 230 and scan the coupled components of the docking station 270 for an audio controller 275.

In another embodiment, the audio management application 210 can configure the interface 230 to scan the docking station for a component which can be an audio controller 275. When determining whether a component is an audio controller 275, the audio management application 210 will read a header file or a tag on the component to determine whether the corresponding component is an audio controller 275.

An audio controller 275 is a component of the docking station 270 which can manage audio from the device 200 and/or from any audio device 285 coupled to the docking station 270. When managing audio, the audio controller 275 can transfer audio received from the device 200 to an audio device 285 coupled to the docking station 270. In another embodiment, the audio controller 275 can transfer audio received from an audio device 285 which is coupled to the docking station 270 to the device 200.

In one embodiment, if no audio controller 275 is found on the docking station 270, the audio management application 210 will send one or more instructions for the controller 260 to utilize one or more audio components 290 coupled to the device 200 when receiving and/or when outputting audio. One or more audio components 290 of the device 200 are audio devices 290 which can detect and/or receive audio. In another embodiment, one or more audio components 290 are output devices configured to output audio.

If the audio management application 210 detects an audio controller 275 coupled to the docking station 270, the audio management application 210 will proceed to access an audio interface 280 of the docking station 270 to determine whether an audio device 285 is coupled to the docking station 270. As illustrated in FIG. 2, an audio interface 280 is a component of the docking station 270 configured to engage an audio device 285 and allow the audio device 285 to communicate with the audio controller 275. In one embodiment, the audio interface 280 includes one or more ports configured to allow the audio device 285 to physically couple with the audio interface 280. In another embodiment, the audio interface 280 includes one or more wireless devices configured to allow the audio device 285 to wirelessly communicate with the docking station 270.

As shown in Figure, an audio device 285 is any device or component which can couple to the audio interface 280 and can be configured by the audio controller 275 to receive or output audio. In one embodiment, the audio device 285 is an input device, such as a microphone. In another embodiment, the audio device 285 is an output device, such as a speaker and/or a headphone.

When determining whether an audio device 285 is coupled to an audio interface 280 of the docking station 270, the audio management application 210 will proceed to scan any audio interfaces 280 of the docking station through the interface 230 for any audio devices 285 which can be coupled to an audio interface 280. In one embodiment, the audio management application 210 scans for one or more signals from an audio interface 280. One or more of the signals can be generated by the audio interface 280 if an audio device 285 is coupled to the audio interface 280. In another embodiment, one or more signals are generated by the audio 285 device and sent through the audio interface 280 when the audio device 285 is coupled to the audio interface 280.

In response to detecting an audio device 285 coupled to the audio interface 280 of the docking station 270, the audio management application 210 will proceed to transfer audio between the device 100 and the audio controller 275 of the docking station 270. When transferring audio between the device 200 and the audio controller 275, the audio management application 210 can initially determine whether the audio device 285 coupled to the audio interface 280 is an input device or an output device.

In one embodiment, the audio management application 210 can query the audio device 285 and prompt the audio device 285 for identification. The identification can specify whether the audio device 285 is an input device or an output device. In another embodiment, the audio management application 210 can access the audio device 285 through the audio interface 280 and proceed to read one or more files available on the audio device 285. One or more of the files can include a header file configured to specify whether the audio device 285 is an input device or an output device.

If the audio management application 210 determines that the audio device 285 is an output device, the audio management application 210 will sends or more instructions for the controller 260 to transfer audio from the device 200 to the audio controller 275 of the docking station 270. In one embodiment, once the audio controller 275 has received the audio from the device 200, the audio controller 275 will configure the audio device 285 to output the audio received from the device 200. Alternatively, the audio controller 275 can transfer the audio received from the device 200 to the audio controller 275 and the audio device 285 can output the audio itself.

In another embodiment, if the audio management application 210 determined that the audio device 285 is an input device, the audio management application 210 will configure the audio controller 275 of the docking station 270 to utilize the audio device 285 to detect and/or record audio. If any audio is detected and/or recorded by the audio device 285, the audio controller 275 will record the audio and proceed to transfer the audio over to the controller 260 of the device 200. In other embodiments, if the audio management application 210 previously determined that no audio device 285 is coupled to an audio interface 280 of the docking station 270, the audio management application 210 will configure the controller 260 to utilize one or more audio components 290 of the device 200 to receive and/or output audio.

Figure 3:
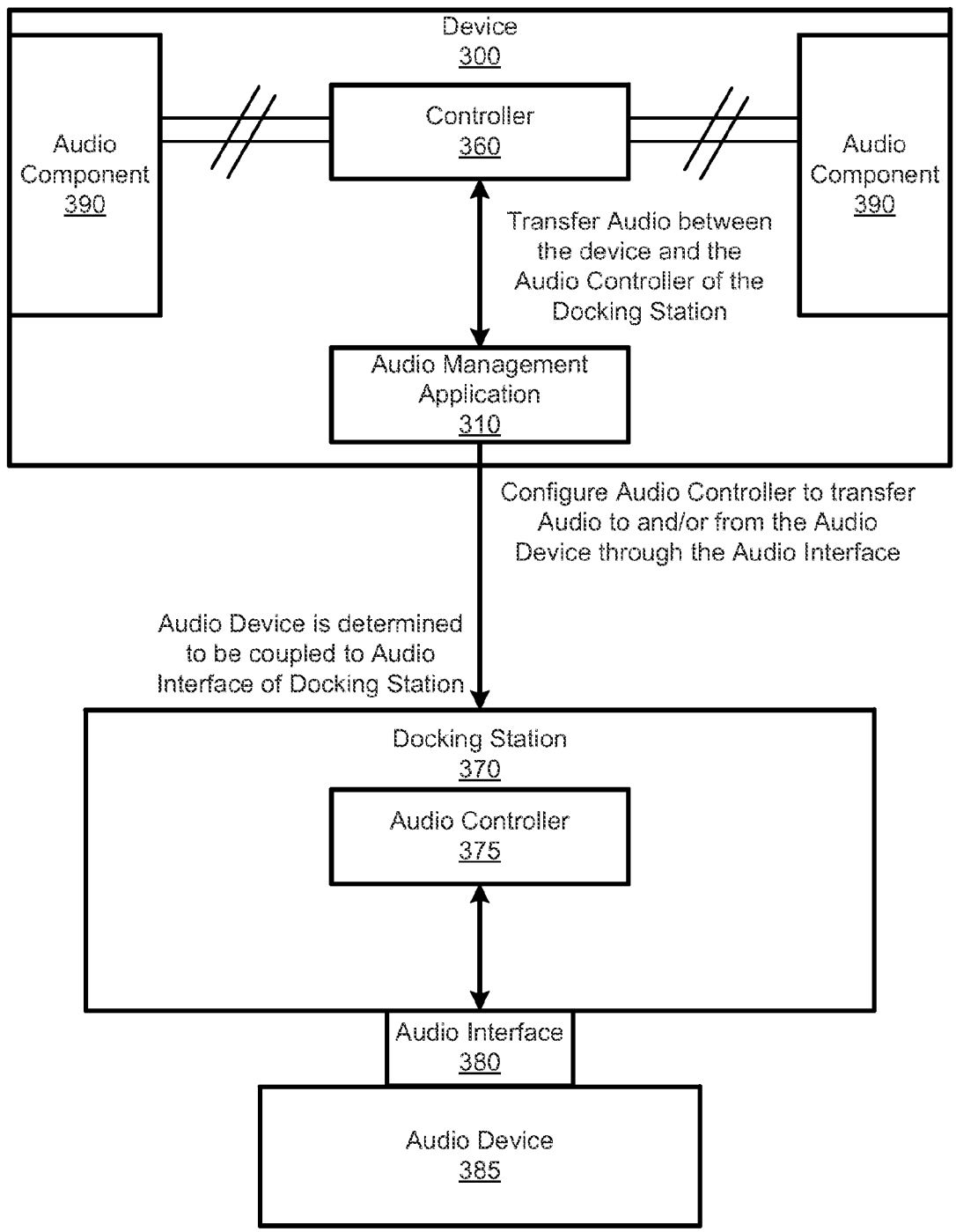
FIG. 3 illustrates a block diagram of an audio management application transferring audio between a device and a docking station according to an embodiment of the invention.

FIG. 3 illustrates a block diagram of an audio management application 310 transferring audio between a device 300 and a docking station 370 according to an embodiment of the invention. As illustrated in present embodiment, the audio management application 310 has determined that the docking station 370 includes an audio controller 375. In one embodiment, in response to locating an audio controller 375, the audio management application 310 proceeds to determine whether the audio controller 375 is enabled.

The audio controller 375 can initially be in a disabled state. The audio controller can include one or more states and the audio controller 375 can enter and/or transition into one or more states in response an audio device coupling to the audio interface. When in the disabled state, the audio controller 375 is not active and does not manage any audio sent to an audio device 385 and/or any audio received from the audio device 385.

Additionally, the audio controller 375 can be configured to transition from the disabled state into an enabled state. In one embodiment, when transitioning into the enabled state, the audio controller 375 can be configured to power on or power can be provided to the audio controller 375 by the device 300 and/or by the docking station 370. When in the enabled state, the audio controller 375 can be configured to manage audio received from a controller 360 of the device 300 and/or manage audio received from the audio device 385.

In one embodiment, the audio controller 375 is configured by the audio management application 310 to transition from the disabled state to the enabled state in response to the device 300 coupling to the docking station 370. In another embodiment, the audio controller 375 will be configured by the audio management application 310 to enter into the enabled state in response to an audio device 385 coupling to the docking station 370 or when the controller 360 is transferring audio between the device 300 and audio controller 375 or audio device 385. In other embodiments, the audio controller 375 will automatically transition into the enabled state by itself in response to an audio device 385 coupling to the docking station 370.

Once the audio controller 375 is found and enabled, the audio management application 310 will determine whether an audio device 385 is coupled to the docking station 370. As illustrated in FIG. 3, the audio device 385 is coupled to the docking station 370 since the audio device 385 is coupled to the audio interface 380 of the docking station 370. As noted above, in response to an audio device 385 being determined to be coupled to the docking station 370, the audio management application 310 will configure the controller 360 to transfer audio between the 360 and the audio controller 375.

As illustrated in FIG. 3, the audio management application 310 configures the audio controller 375 to transfer audio to and/or from the audio device 385 through the audio interface 380. In one embodiment, the audio management application 310 additionally determines whether the audio device 385 is an input device or an output device. If the audio device 385 is an input device, the audio management application 310 will instruct the audio controller 375 to detect audio from the audio device 385 and transfer the audio to the controller 360.

In another embodiment, if the audio device 385 is an output device, the audio management application 310 will instruct the controller 360 to transfer audio to the audio controller 375. The audio controller 375 can then configure the audio device 385 to output the audio or pass the audio to the audio device 385 for outputting. Additionally, as shown in the present embodiment, in response to transferring audio between the device 300 and the audio controller 375 on the docking station 370, one or more audio components 390 of the device 300 are not utilized by the controller 360.

Figure 4:
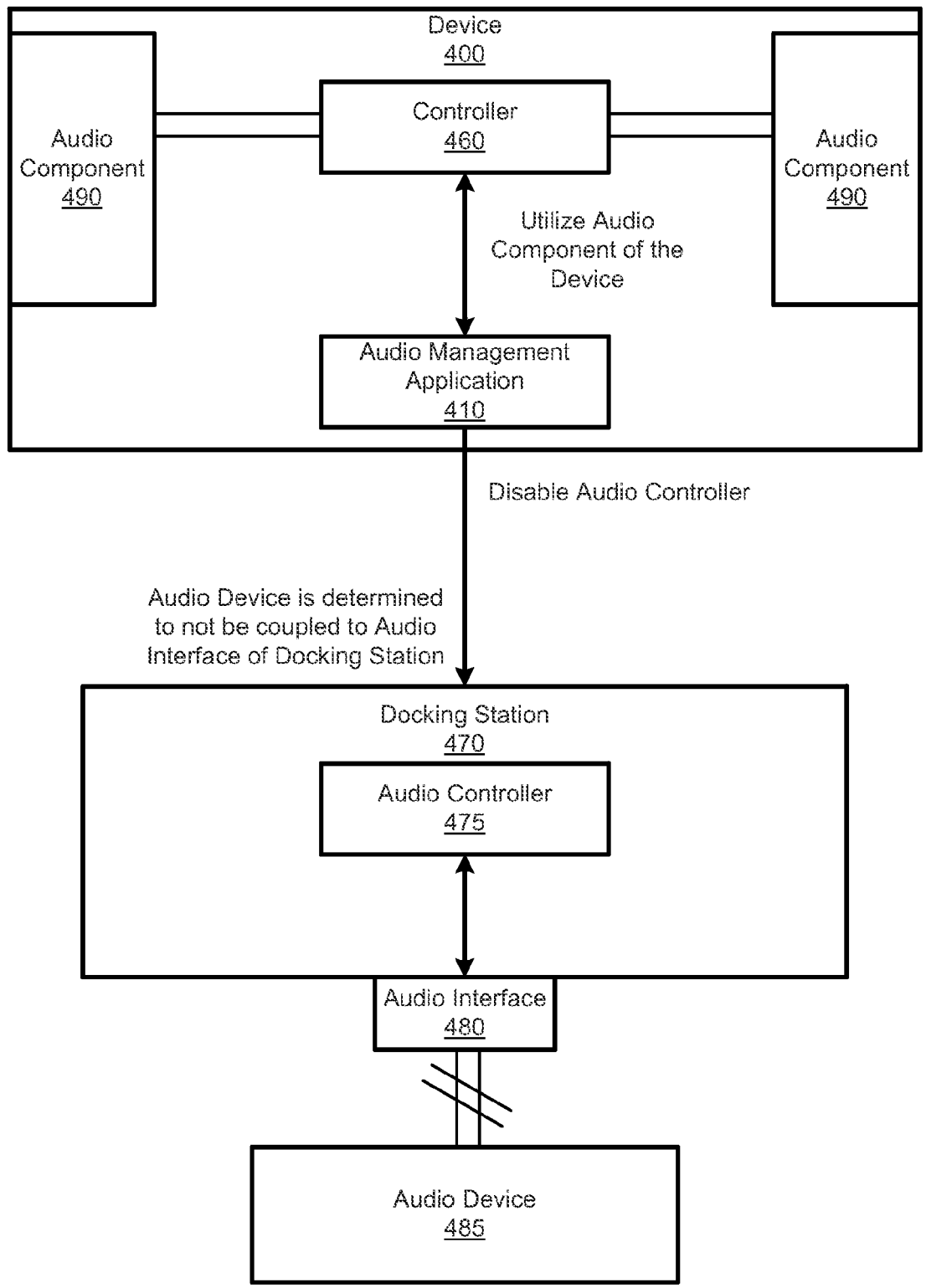
FIG. 4 illustrates a block diagram of an audio management application transferring audio between a device and a docking station according to another embodiment of the invention.

FIG. 4 illustrates a block diagram of an audio management application 410 transferring audio between a device 400 and a docking station 470 according to another embodiment of the invention. As shown in the present embodiment, the audio management application 410 has determined that the docking station 470 includes an audio controller 475 and proceeds to determine whether an audio device 485 is coupled to the docking station 470.

In one embodiment, the audio management application 410 can query or poll the audio controller 475 and/or the audio interface 480 for any signals generated in response to an audio device 485 coupling to an audio interface 480 of the docking station 470. As illustrated in FIG. 4, the audio management application 410 has determined that the audio device 485 is not coupled to an audio interface 480 of the docking station 470. As a result, the audio device 485 is not coupled to the docking station 480.

As noted above and as illustrated in FIG. 4, in response to determining that an audio device 485 is not coupled to the audio interface 480, the audio management application 410 configures a controller 460 of the device 400 to utilize one or more audio components 490 coupled to the device 400. As noted above, one or more of the audio components 490 are input and/or output devices configured to output audio from the controller 460 or receive audio for the controller 460.

In one embodiment, as illustrated in FIG. 4, if no audio is being transferred between the controller 460 of the device 400 and the audio controller 475 of the docking station 470, the audio management application 410 will configure the audio controller 475 to enter into a disable state. As noted above, in one embodiment, the audio controller 475 can default into a disabled state. If the audio controller 475 is determined to already be in the disabled state, the audio management application 410 will not perform any additional action.

In another embodiment, if the audio controller 475 is currently in an enabled or active state, the audio management application 410 will send one or more instructions for the audio controller 475 to transition into the disabled state. When transitioning into the disabled state, the audio controller 475 can be configured to power down or power provided to the audio controller 475 through the device 400 or the docking station 470 can be halted.

Figure 5:
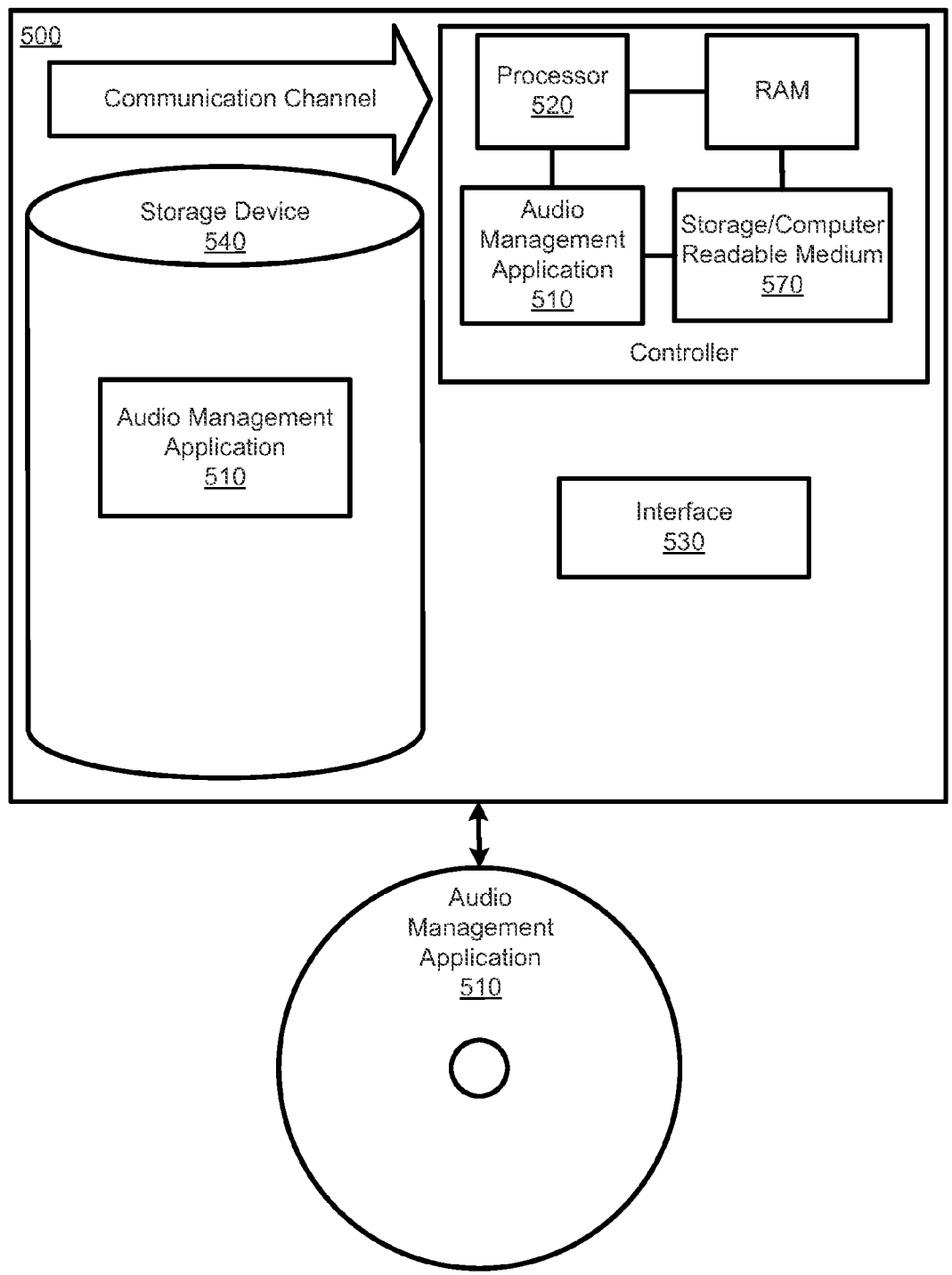
FIG. 5 illustrates a device with an embedded audio management application and an audio management application stored on a removable medium being accessed by the device according to an embodiment of the invention.

FIG. 5 illustrates a device 500 with an embedded audio management application 510 and an audio management application 510 stored on a removable medium being accessed by the device 500 according to an embodiment of the invention. For the purposes of this description, a removable medium is any tangible apparatus that contains, stores, communicates, or transports the application for use by or in connection with the device 500. As noted above, in one embodiment, the audio management application 510 is firmware that is embedded into one or more components of the device 500 as ROM. In other embodiments, the audio management application 510 is a software application which is stored and accessed from a hard drive, a compact disc, a flash disk, a network drive or any other form of computer readable medium that is coupled to the device 500.

Figure 6:
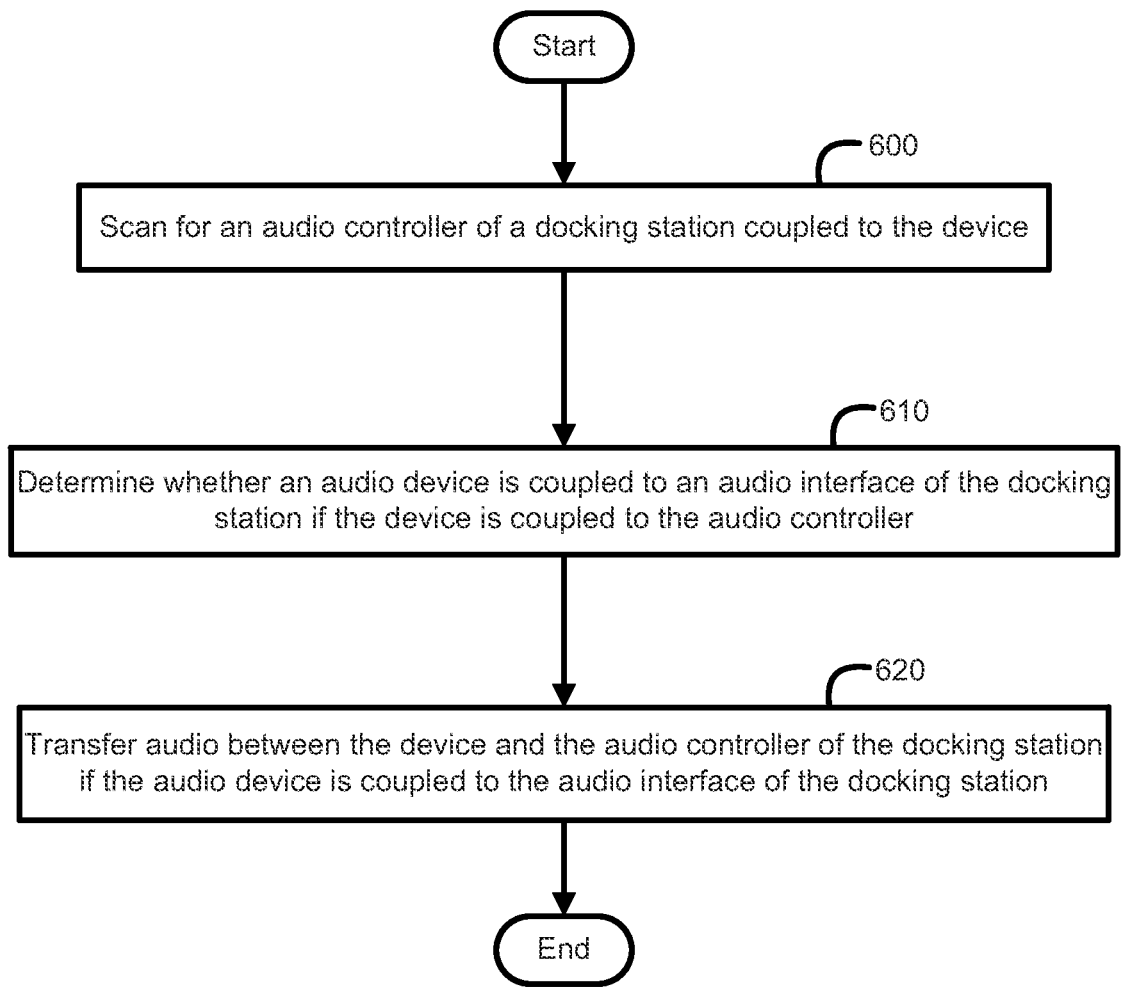
FIG. 6 is a flow chart illustrating a method for managing audio of a device according to an embodiment of the invention.

FIG. 6 is a flow chart illustrating a method for managing audio of a device according to an embodiment of the invention. The method of FIG. 6 uses a device with a processor, an interface, a communication channel, a storage device, and an audio management application. In one embodiment, the method of FIG. 6 additionally utilizes a controller and one or more audio components of the device. In other embodiments, the method of FIG. 6 uses additional components and/or devices in addition to and/or in lieu of those noted above and illustrated in FIGS. 1, 2, 3, 4, and 5.

As noted above, the audio management application is an application which can manage audio of the device. Additionally, a processor of the device initially sends one or more instructions for the audio management application to determine whether the device is coupled to a docking station. The device can be or include a computing machine, a desktop, laptop, netbook, server, PDA, and/or cellular device. Further, the docking station is a device which can couple and interface with the device.

When determining whether the device is coupled to the docking station, the audio management application can query or poll the interface of the device to determine whether the interface has engaged and coupled with a component of the docking station. The interface is a component of the device configured to engage the component and couple the device to the docking station. Additionally, the component is a device or component of the docking station configured to engage the interface and couple the docking station to the device.

In one embodiment, the interface and the component can include one or more ports or devices configured to physically engage one another. In another embodiment, the interface and/or the component include one or more wireless devices configured to engage and communicate with one another through a wireless connection. Once the device is coupled to the docking station, the audio management application will proceed to scan the docking station for an audio controller 600.

As noted above, once the device is coupled to the docking station, the interface of the device can couple with one or more components of the docking station. Additionally, the audio management application can scan and/or poll the components for identification. In one embodiment, the audio management application will scan the docking station through the docking station. In another embodiment, the audio management application will configure the interface to scan the docking station. The identification can include one or more files or signals which the audio management application can utilize to determine whether one of the components is an audio controller.

Once an audio controller is found on the docking station, the audio management application will proceed to determine whether an audio device is coupled to an audio interface of the docking station 610. As noted above, an audio device is an input and/or output device which can interface and couple with the docking station through the audio interface. In one embodiment, when determining whether an audio device is coupled to an audio interface of the dockings station, the audio management application will scan for one or more signals generated from the audio interface and/or from the audio device.

As noted above, one or more of the signals are generated if the audio device is coupled to the audio interface. If the audio management application determines that the audio device is coupled to the audio interface, the audio management application will proceed to transfer audio between the device and the audio controller of the docking station 620. In one embodiment, the audio management application will additionally determine whether the audio device is an input device or an output device.

If the audio device is an input device, the audio management application will instruct the audio controller to detect audio from the audio device and transfer any detected audio to the controller of the device. If the audio device is an output device, the audio management application will instruct the controller to transfer audio from the device to the audio controller. The audio management application can then instruct the audio controller to configure the audio device to output the audio or pass the audio to the audio device for outputting.

In another embodiment, if no audio device is coupled to the audio interface or if the audio management application originally determined that the docking station does not include an audio controller, the audio management application will instruct the controller of the device to utilize one or more audio components coupled to the device when receiving and/or outputting audio. The method is then complete or the audio management application can continue to manage audio from the device in response to determining whether an audio device is coupled to an audio interface of the docking station. In other embodiments, the method of FIG. 6 includes additional steps in addition to and/or in lieu of those depicted in FIG. 6.

Figure 7:
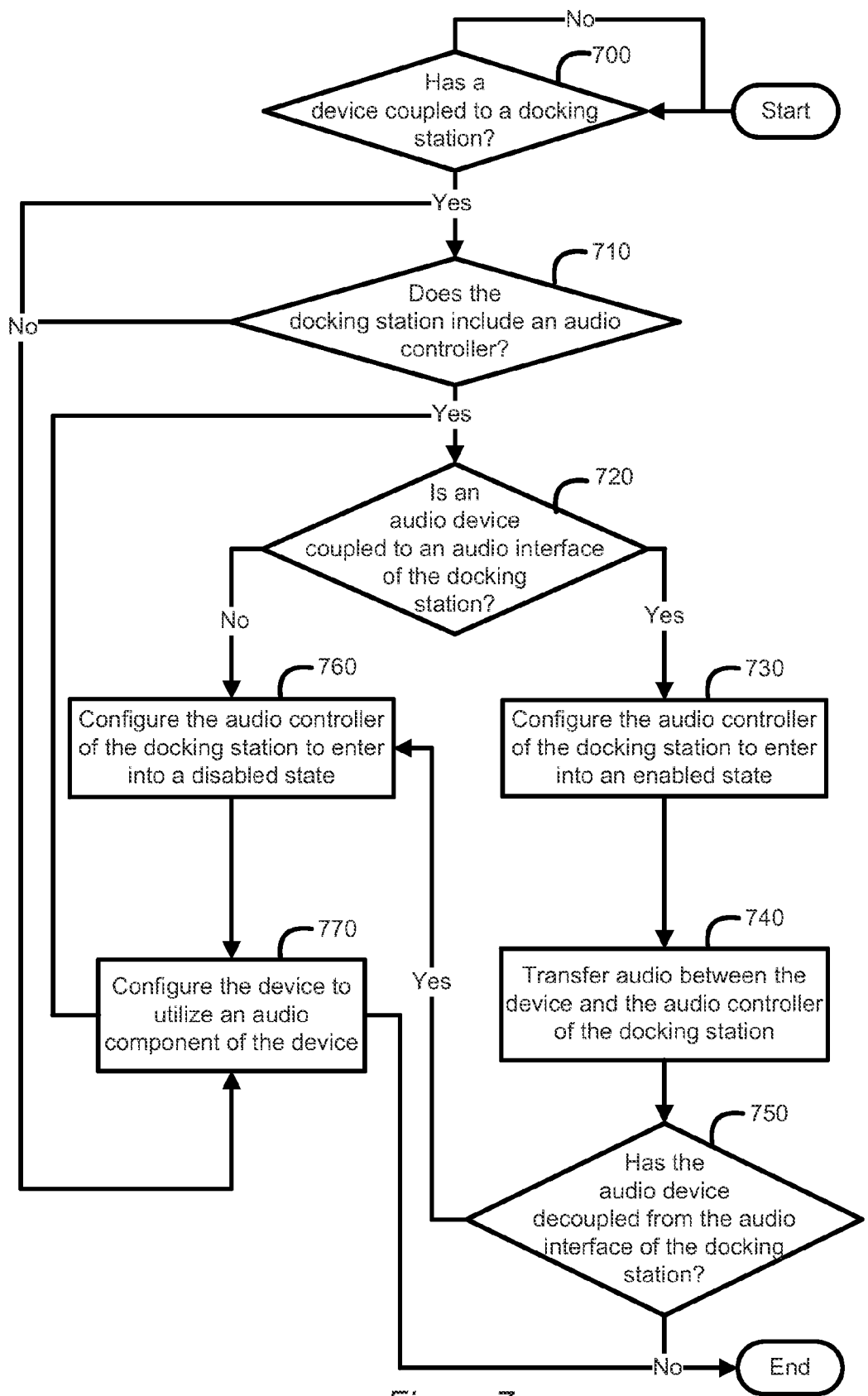
FIG. 7 is a flow chart illustrating a method for managing audio of a device according to another embodiment of the invention.

FIG. 7 is a flow chart illustrating a method for managing audio of a device according to another embodiment of the invention. Similar to the method of FIG. 6, the method of FIG. 7 uses a device with a processor, an interface, a communication channel, a storage device, and an audio management application. In one embodiment, the method of FIG. 7 additionally utilizes a controller and one or more audio components of the device. In other embodiments, the method of FIG. 7 uses additional components and/or devices in addition to and/or in lieu of those noted above and illustrated in FIGS. 1, 2, 3, 4, and 5.

As noted above, a processor of the device initially sends one or more instructions for an audio management application to scan an interface of the device to determine whether the device has coupled to a docking station 700. As noted above, the interface can send the one or more signals to the audio management application when the interface engages a component of the docking station and couples the device to the docking station. If the audio management application does not detect any signals from the interface, the audio management application will continue to determine whether the device has coupled to the docking station 700.

Once the device is coupled to the docking station, the processor will send an instruction for the audio management application to determine whether the docking station includes an audio controller 710. As noted above, when determining whether the docking station includes an audio controller, the audio management application will access and scan one or more components of the docking station through the interface for a signal or file to identify whether any of the components are an audio controller.

In another embodiment, the audio management application will instruct the interface to scan the docking station for the audio controller. If no audio controller is found on the docking station, the audio management application will configure the device by instructing a controller of the device to utilize one or more audio components of the device when inputting and/or outputting audio 770.

In another embodiment, if an audio controller is found on the docking station, the audio management application will proceed to determine whether an audio device is coupled to an audio interface of the docking station 720. The audio management application will scan for one or more signals generated by the audio interface or the audio device. As noted above, one or more of the signals are generated by the audio interface and/or the audio device when the audio device has engaged the audio interface.

In one embodiment, if the audio management application detects one or more of the signals, the audio management application will determine that an audio device is coupled to the audio interface. In response to the audio device being coupled to the audio interface, the audio management application will configure the audio controller to enter and/or transition into an enabled state 730. As noted above, the audio controller can enter and/or transition into one or more states in response an audio device coupling to the audio interface.

In another embodiment, the audio controller can be configured to enter and/or transition into the enabled state in response to the device initially coupling to the docking station. Additionally, when configuring the audio controller to enter and/or transition into the enabled state, the audio management application can instruct the audio controller to power on or the audio management application can instruct a power supply to supply power to the audio controller. Once the audio controller is enabled, the audio management application will send one or more instructions to the controller of the device to transfer audio between the device and the audio controller of the docking station 740.

As noted above, when transferring audio between the device and the audio controller, the audio management application can determine whether the audio device is an input device or an output device. In one embodiment, if the audio device is an input device, the audio management application will configure the audio controller to detect audio from the audio device and transfer any detected audio to the controller of the device. In another embodiment, if the audio device is an output device, the audio management application will instruct the controller of the device to transfer audio from the device to audio controller. The audio controller can then configure the audio device to output the audio or pass the audio to the audio device for outputting.

The audio management application will then continue to scan for one or more signals from the audio interface or the audio device to determine whether the audio device has decoupled from the audio interface of the docking station 750. If the audio management application determines that signals are no longer being detected or if the audio management application originally did not detect any signals from the audio device or the audio interface, the audio interface will configure the audio controller of the docking station to enter into a disabled state 760.

In other embodiments, the audio controller can be configured to enter into the disabled state in response to the device decoupling from the docking station. Additionally, when in the disabled state, the audio controller is configured to power down or power supplied to the audio controller is halted. Further, in response to no audio device being coupled to the audio interface, the audio management application proceeds to configure the controller of the device to utilize one or more audio components coupled to the device when receiving or outputting audio 770.

The method is then complete or the audio management application can continue to manage audio of the device in response to determining whether an audio device is coupled to an audio interface of the dockings station. In other embodiments, the method of FIG. 7 includes additional steps in addition to and/or in lieu of those depicted in FIG. 7.

What is claimed is:

1. A method for managing audio of a computing device, the method performed by one or more processors of the computing device and comprising:
    detecting a docking event with a docking station;
    in response to detecting the docking event, scanning the docking station to identify an audio controller of the docking station;
    determining, from the audio controller, whether one of a plurality of detectable audio devices is coupled to an audio interface of the docking station; and
    based on determining that a specified audio device is coupled to the audio interface of the docking station, transferring audio between the specified audio device and the computing device via the audio controller of the docking station.

2. The method of claim 1, further comprising:
    in response to determining that the specified audio device is coupled to the audio interface of the docking station, determining whether the specified audio device is an input device or an output device; and
    in response to determining that the specified audio device is an output device, sending audio to the audio controller to output through the specified audio device.

3. The method of claim 1, further comprising:
    in response to determining that the specified audio device is coupled to the audio interface of the docking station, determining whether the specified audio device is an input device or an output device; and
    in response to determining that the specified audio device is an input device, receiving and recording audio from the audio controller.

4. The method of claim 1, wherein scanning the docking station comprises reading a tag included with each of one or more components of the docking station.

5. The method of claim 1, further comprising:
    in response to determining that none of the plurality of detectable audio devices are coupled to the audio interface of the docking station, configuring the computing device to transfer audio through at least one audio component of the computing device.

6. The method of claim 1, further comprising:
    in response to identifying the audio controller, determining whether the audio controller is in an enabled state or a disabled state; and
    in response to determining that the audio controller is in the disabled state, enabling the audio controller to determine whether one of the plurality of detectable audio devices is coupled to the audio interface of the docking station.

7. A computing device comprising:
    a processor; and
    one or more memory resource storing instructions that, when executed by the processor, cause the computing device to:

detect a docking event with a docking station;
in response to detecting the docking event, scan a docking station to identify an audio controller of the docking station;
determine, from the audio controller, whether one of a plurality of detectable audio devices is coupled to an audio interface of the docking station; and
based on determining that a specified audio device is coupled to the audio interface of the docking station, transfer audio between the specified audio device and computing device via the audio controller of the docking station.

8. The computing device of claim 7, wherein the executed instructions further cause the computing device to:
in response to identifying the audio controller, determine whether the audio controller is in an enabled state or a disabled state; and
in response to determining that the audio controller is in the disabled state, enabling the audio controller to determine whether one of the plurality of detectable audio devices is coupled to the audio interface of the docking station.

9. The computing device of claim 8, wherein the executed instructions cause the computing device to enable the audio controller based on detecting the docking event.

10. The computing device of claim 8, wherein the executed instructions cause the computing device to enable the audio controller based on the specified audio device being coupled to the audio interface of the docking station.

11. The computing device of claim 8, wherein the executed instructions cause the computing device to enable the audio controller based on transferring audio between the computing device and the audio controller of the docking station.

12. The computing device if claim 8, wherein the executed instructions cause the computing device to disable the audio controller when the audio interface of the docking station decouples with the specified audio device.

13. A non-transitory computer-readable medium storing instructions that, when executed by one or more processors of a computing device, cause the computing device to perform operations comprising:
detecting a docking event with a docking station;
in response to detecting the docking event, scanning the docking station to identify an audio controller of the docking station;
determining, from the audio controller, whether one of a plurality of detectable audio devices is coupled to an audio interface of the docking station; and
based on determining that a specified audio device is coupled to the audio interface of the docking station, transfer audio between the specified audio device and the computing device via the audio controller of the docking station.

14. The non-transitory computer-readable medium of claim 13, wherein the executed instructions cause the computing device to perform further operations comprising:
in response to determining that the specified audio device is coupled to the audio interface of the docking station, determining whether the specified audio device is an input device or an output device; and
in response to determining that the specified audio device is an output device, sending audio to the audio controller to output through the specified audio device.

15. The non-transitory computer-readable medium of claim 13, wherein the executed instructions cause the computing device to perform further operations comprising:
in response to determining that the specified audio device is coupled to the audio interface of the docking station, determining whether the specified audio device is an input device or an output device; and
in response to determining that the specified audio device is an input device, receiving and recording audio from the audio controller.

* * * * *

UNITED STATES PATENT AND TRADEMARK OFFICE
CERTIFICATE OF CORRECTION

| | | |
|---|---|---|
| PATENT NO. | : 9,218,843 B2 | Page 1 of 1 |
| APPLICATION NO. | : 13/700131 | |
| DATED | : December 22, 2015 | |
| INVENTOR(S) | : Peter Yen et al. | |

It is certified that error appears in the above-identified patent and that said Letters Patent is hereby corrected as shown below:

Claims

In column 11, line 34 approx., in Claim 12, delete "device if" and insert -- device of --, therefor.

Signed and Sealed this
Twenty-sixth Day of April, 2016

Michelle K. Lee
*Director of the United States Patent and Trademark Office*